(No Model.) 2 Sheets—Sheet 1.

G. & W. ROSS.
WATER ENGINE VALVE.

No. 384,336. Patented June 12, 1888.

WITNESSES:

INVENTORS,
George Ross,
William Ross,
BY
Geo. A. Mosher
ATTORNEY.

(No Model.) 2 Sheets—Sheet 2.

G. & W. ROSS.
WATER ENGINE VALVE.

No. 384,336. Patented June 12, 1888.

WITNESSES:

INVENTORS,
George Ross,
William Ross.

BY
Geo. A. Mosher,
ATTORNEY.

UNITED STATES PATENT OFFICE.

GEORGE ROSS AND WILLIAM ROSS, OF TROY, NEW YORK.

WATER-ENGINE VALVE.

SPECIFICATION forming part of Letters Patent No. 384,336, dated June 12, 1888.

Application filed July 17, 1885. Serial No. 171,834. (No model.)

*To all whom it may concern:*

Be it known that we, GEORGE ROSS and WILLIAM ROSS, residents of the city of Troy, in the county of Rensselaer and State of New York, have invented certain new and useful Improvements in Water-Engine Valves; and we do hereby declare that the following is a full, clear, and exact description of the invention, that will enable others skilled in the art to which it appertains to make and use the same, reference being had to the accompanying drawings, and to the letters of reference marked thereon, which form a part of this specification.

Similar letters refer to similar parts in the several figures therein.

Our invention relates to improvements in water-engine valves.

The objects of our invention are, first, to so control the movements of a water-engine valve as to eliminate the pounding or jerky movements of the engine or valve due to the *vis inertiæ* of the moving water or to operating stops or springs heretofore employed; second, to reduce the valve travel necessary to open or close the ports of a water-engine to a minimum.

Our invention consists, first, in providing the cylinder-ports of a water-engine with a differential slide-valve having in its casing operating-ports controlled by an independent piston-operated valve, as hereinafter more fully described; second, in providing the piston-operated valve with a projecting stem to act positively upon the differential valves in case the water-pressure should at any time be insufficient to overcome the friction of the latter valve; third, in providing the valve-operating ports or the ducts leading thereto with adjustable gates, whereby the water at said ports may be controlled to limit the rate of travel of the differential valve; fourth, in extending the cylinder-ports around the differential valves by a duct or ducts having a narrow contracted mouth opening into the valve-chamber.

Figure 1:
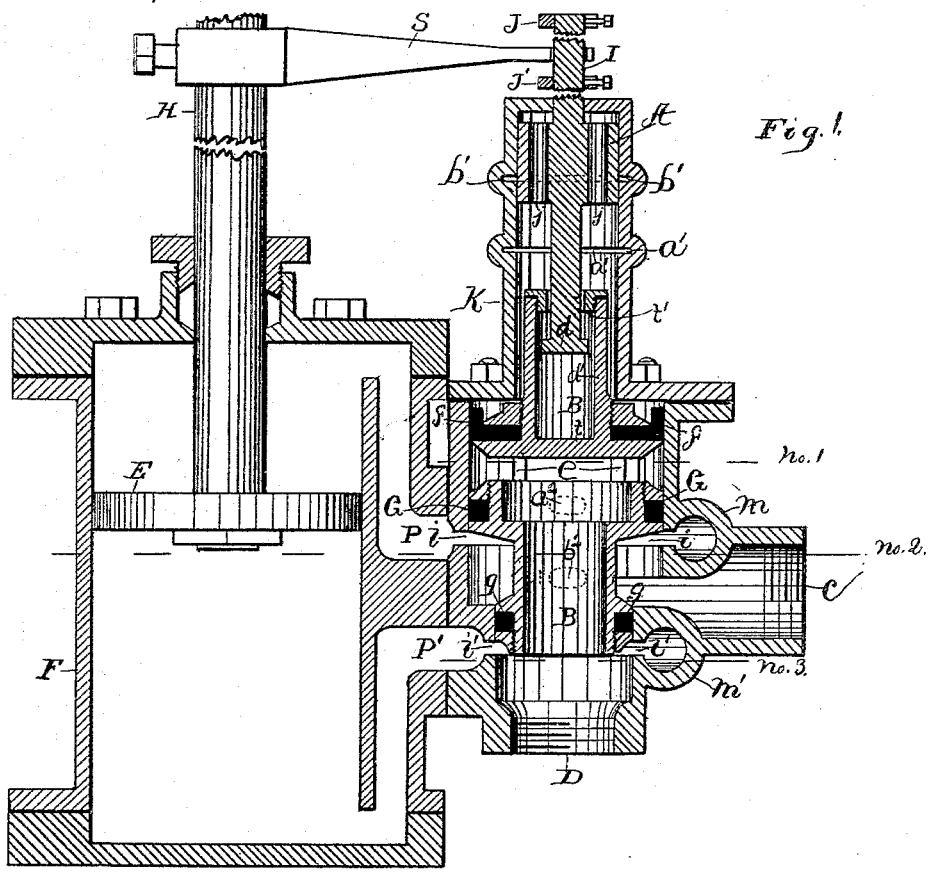
Figure 2:
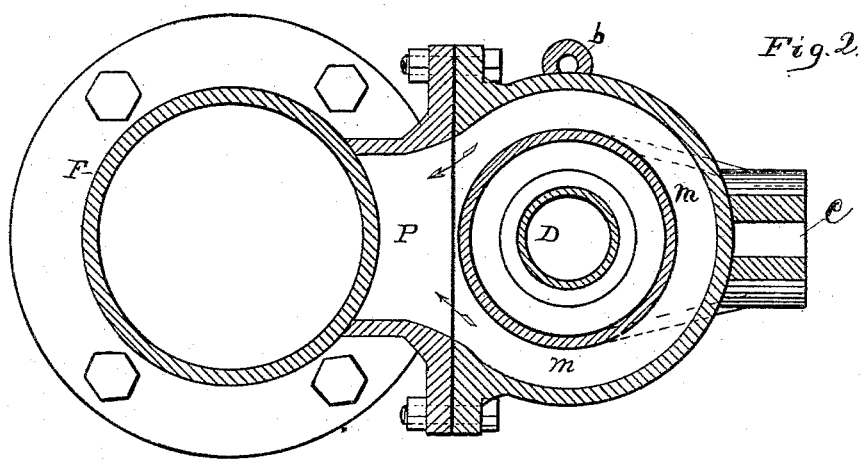
Figure 3:
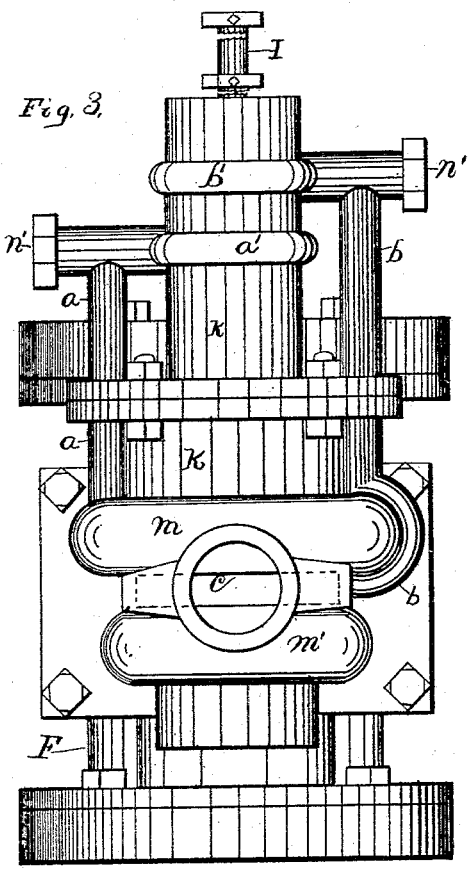
Figure 4:
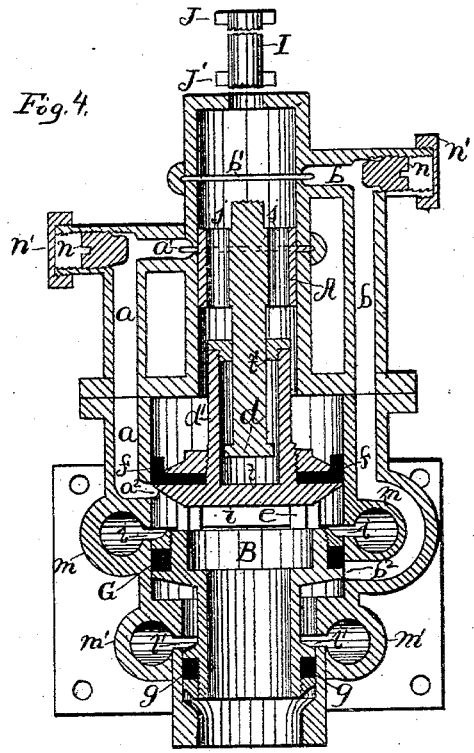
Figure 5:
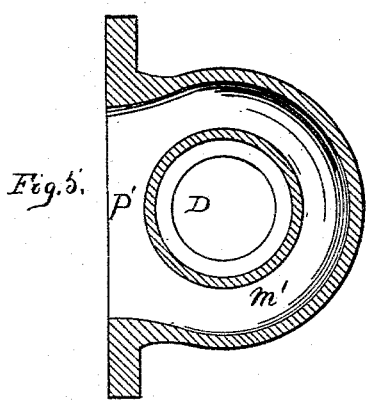
Figure 6:
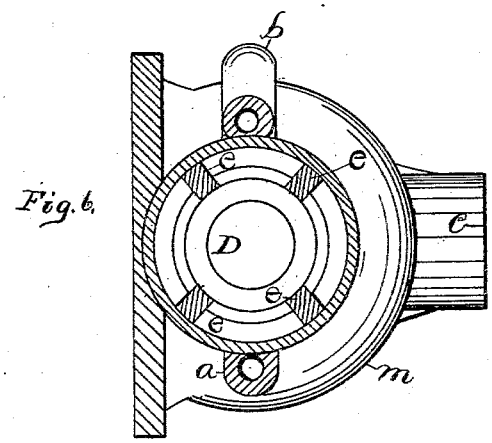

Figure 1 of the drawings is a central vertical section of our improved valve attached to a water-engine. Fig. 2 is a longitudinal section taken at the broken line No. 2 in Fig. 1. Fig. 3 is a side elevation of the valve attached. Fig. 4 is a central vertical section of the valve, taken on a plane at right angles to that shown in Fig. 1. Fig. 5 is a horizontal section of valve detached, taken at broken line No. 3 in Fig. 1. Fig. 6 is a horizontal section of same, taken at broken line No. 1 in Fig. 1.

The primary valve A and secondary valve B are inclosed in a common chamber-case, K, which is firmly secured to one side of the engine-cylinder F. The latter is provided with ports P P', leading into the valve-chamber, and with piston E, operating piston-rod H. To the piston-rod is adjustably attached arm S, adapted to engage, when in operation, with stops J J', adjustably secured to the stem I of the primary valve A. The primary valve is also provided with perforations $j\ j$, through which the inclosed water may freely flow as the valve is caused by arm S to slide up and down to open and close the ports $a'$ and $b'$. The secondary valve B is a differential valve, and is composed of the packing, $f$, fitting the valve-chamber, and of the valves proper, G and $g$.

The valve G serves to open and close the valve-port $i$, leading to and forming a part of the cylinder-port P, while the valve $g$ serves to open and close the valve-port $i'$, leading to and forming a part of the cylinder-port P'. The water is admitted through inlet C and discharged from outlet D. The valve-chamber is also provided with the run-around ducts $a$ and $b$, which open into the chamber below and above the packing, $f$, and valve G, forming the valve-ports $a'$ and $b'$ above and the ports $a^2$ and $b^2$ below.

In Fig. 1 the valves are shown in position to admit the water into the cylinder F above the piston. The water enters at C and, passing around the hollow cylindrical stem connecting the valves G and $g$, enters the narrow slot forming the valve-port $i$ and runs around through the enlarged duct through port P into the cylinder above the piston, the water below the piston passing out through ports P' and $i'$ into the valve-chamber and out at outlet D. The inlet C and outlet D are threaded, as shown, to permit of the attachment of supply and discharge pipes. When the piston has descended to a point near the bottom of the cylinder, the arm S on the piston-rod comes in contact with the lower stop, J', on valve-stem I and forces valve A downward to the position shown in Fig. 4, opening port $b'$ and closing port $a'$. As the port $b'$ is connected by duct $b$ and port $b^2$ with the inlet-chamber of the secondary valve B, the water is forced through port $b'$ down through apertures $j$ in valve A against the secondary valve, or, strictly speaking, against the head with packing, $f$, to which the secondary valve is attached by the posts $e$, with the same initial pressure as that of the water in the inlet-chamber, which pressure is exerted upon valve G to force the secondary valve upward; but the pressure in the inlet-chamber is also exerted upon the valve $g$ to force it downward. If, then, the sectional areas of the packed head $f$ and valve G are the same, as shown, and the sectional area of the valve $g$ is less than that of the valve G, there will be a resultant downward pressure proportional, so long as the resistance is sufficient to hold the valve at rest, to the difference in said areas. As soon as the frictional resistance is overcome, the secondary valve descends until valve G passes port $i$, closing it to the inlet-chamber and opening it to the outlet down through the hollow cylindrical stem of the secondary valve to outlet D. At the same time valve $g$ passes the port $i'$, opening it to the inlet-chambers and closing it to the outlet D, as shown in Fig. 4. The water then enters the cylinder beneath piston E by ports $i'$ and $P'$ and passes out from above the piston by ports P and $i$ down through the hollow valve and outlet D. The piston then rises in its cylinder until arm S comes in contact with the upper stop, J, which lifts the valve A until the port $b'$ is closed and port $a'$ is opened.

When port $b'$ is closed, the downward pressure upon the secondary valve is cut off, and the resultant upward pressure becomes proportional to the difference in sectional area of the valves G and $g$. The result is the secondary valve is forced up from the position shown in Fig. 4 to that shown in Fig. 1, the inclosed water above the secondary valves being forced out through open port $a'$, along duct $a$, out port $a^2$, and through the hollow valve to outlet D.

From the foregoing it will readily appear that the secondary valve does not come in contact with any stop to pound thereon or be suddenly stopped, for the reason that when it descends under the resultant downward pressure, as explained, to the position shown in Fig. 4, valve G closes the port $b^2$ and cuts off the supply to duct $b$, and consequently the downward pressure, whereupon the resultant upward pressure, before explained, holds the valve from descending farther, and would force it up again, but the moment the port $b^2$ is partially opened the downward pressure is restored, so that the valve is retained in this balanced position by the water-pressure only. In the same manner when the secondary valve has traveled upward to the position shown in Fig. 1 it closes the port $a^2$, (shown in dotted lines,) and the escape of the water above the valve is cut off, so that the resultant upward pressure before mentioned is powerless to force the valve any farther. We are thus able to operate the cylinder port-valves in a steady and easy manner without the use of springs or stops by which a sudden or jerky motion is imparted thereto. It will also readily appear that if the ducts $a$ and $b$ are reduced in size more time will be consumed in forcing a given quantity of water through them, and the downward pressure upon the secondary valves would be considerably diminished while the latter was in motion, on account of the much greater sectional area of the valve chamber, and the upward pressure when the valves are traveling upward would meet with a greater resistance in expelling the spent water from the valve-chamber through duct $a$ if the latter were diminished in size or sectional area of its orifice. We therefore provide for each of said ducts a gate, $n$, which we have shown in the form of a screw to be turned down to nearly close the ducts when desired, it only being necessary to remove the caps $n'$ and adjust the gates as desired by a screw-driver. We are thus able to control the rapidity of movement of the secondary valves, which is of the greatest importance in some of the uses to which water-engines with our improved valve may be put. For example, in working the bellows of a musical organ in churches it is necessary that the piston-stroke of the engine should be steady and even, without the pounding or jerking due to offering a sudden resistance to a moving body of water, which suddenly adds the force of inertia to that of pressure, involving the principle of the hydraulic ram.

By encircling the valve-chamber with ducts opening laterally by narrow slots $i$, extending longitudinally of the ducts, into the chamber, we are able to produce very narrow port-openings, which can be opened and closed by a minimum travel of the valves, which reduces the friction and loss of water necessary to operate the valves.

In case at any time the frictional resistance of the secondary valves should be sufficient to withstand the resultant water-pressure referred to, we have provided the primary valve with a stem, $d$, which projects down into a corresponding projection, $d'$, from the secondary valves, and is adapted to engage therewith to forcibly slide the same until the friction is overcome sufficiently to yield to the water-pressure, as before explained; also, when the piston E has little or no work to do and its movement is very rapid, the differential pressure upon the secondary valves would be very slight, and, perhaps, too slow to prevent the piston from striking its cylinder-head. By arranging the valve projections $d$ and $d'$ substantially as shown the head of projection $d$ will strike at $t$ on the descending stroke of the piston and operate the secondary valves, and on the upward stroke will strike at $t'$, reversing the valves.

The ducts $m\ m'$ are preferably made of cast metal cast integral with the valve-case, thereby giving it strength.

What we claim as new, and desire to secure by Letters Patent, is—

1. The combination, in a water engine valve, of a differential sliding cylinder-port valve having an inclosing-chamber provided with run-around ducts opening at each end by ports into said chamber, the ports at one end of said ducts being opened and closed by said valve, with a piston-operated valve for opening and closing the ports at the other end of said ducts, all arranged and operating substantially as and for the purposes set forth.

2. In a water-engine valve, the combination of a primary piston-operated valve, A, a secondary differential cylinder-port valve, B, an inclosing-chamber provided with run-around ducts $a$ $b$, inlet C, and outlet D, substantially as and for the purposes set forth.

3. In a water-engine valve having a primary piston-operated valve, a secondary differential cylinder-port valve inclosed within a chamber provided with run-around ducts, the combination, with said valves, of a stem or link attached to or projecting from one of said valves and adapted to engage with the others, as and for the purposes set forth.

4. In a water-engine valve having a primary piston-operated valve, a secondary differential cylinder-port valve inclosed within a chamber provided with run-around ducts $a$ $b$, the combination, with said ducts, of adjustable gates therein for changing and regulating their water-discharging capacity, substantially as and for the purposes set forth.

In testimony whereof we have hereunto set our hands this 14th day of July, 1885.

GEORGE ROSS.
WILLIAM ROSS.

Witnesses:
GEO. A. MOSHER,
CHAS. L. ALDEN.